United States Patent [19]

Raphael

[11] 4,406,513
[45] Sep. 27, 1983

[54] OPTICAL REPEATER SYSTEM HAVING AN AUTOMATIC OPTICAL BY-PASS

[75] Inventor: Howard A. Raphael, Palo Alto, Calif.

[73] Assignee: Cermetek, Inc., Sunnyvale, Calif.

[21] Appl. No.: 242,549

[22] Filed: Mar. 11, 1981

[51] Int. Cl.$^3$ .............................................. G02B 7/26
[52] U.S. Cl. .............................. 350/96.16; 350/96.20; 350/331 R; 455/601
[58] Field of Search ............... 350/96.15, 96.16, 96.20, 350/330, 331 R, 332; 455/601

[56] References Cited

U.S. PATENT DOCUMENTS

| | | | |
|---|---|---|---|
| 3,801,819 | 4/1974 | Ohnsorge | 455/601 |
| 3,851,167 | 11/1974 | Levine | 350/96.1 X |
| 3,943,358 | 3/1976 | Reymond et al. | 350/96.1 X |
| 4,148,558 | 4/1979 | Schuck | 350/96.2 |
| 4,246,475 | 1/1981 | Altman | 350/96.15 X |

FOREIGN PATENT DOCUMENTS

| | | | |
|---|---|---|---|
| 52-76802 | 6/1977 | Japan | 455/601 |
| 53-84503 | 7/1978 | Japan | 455/601 |

OTHER PUBLICATIONS

Burke et al., "Fiber Optic Repeater Bypass Switch," *IBM Tech. Discl. Bull.*, vol. 18, No. 2, Jul. 1975, pp. 481–482.
Comerford, "Fiber-Optic Bypass Switch," *IBM Tech. Discl. Bull.*, vol. 21, No. 10, Mar. 1979, pp. 4280–4281.
Soref, "Fiber-Optic Switching With Liquid Crystals," *Conf. Proc. of SPIE*, Washington, D.C. Apr. 1979, pp. 124–132.
Rawson et al., "A Fiber Optical Relay for Bypassing Computer Network Repeaters", *Opt. Engr.*, vol. 19, No. 4, Jul./Aug. 1980, pp. 628–629.

Primary Examiner—John D. Lee
Attorney, Agent, or Firm—Lewis H. Eslinger

[57] ABSTRACT

Apparatus for transmitting an optical information signal from an input fiber optic cable to an output fiber optic cable includes a first regenerative repeater path having a first diode for converting the optical information signal to an electrical signal, an amplifier for amplifying the electrical signal, and a second diode for converting the amplified electrical signal to an amplified optical information signal and for supplying this latter signal to the output fiber optic cable; and a second by-pass path including a fiber optic liquid crystal gate having an input cable with a first optical end face, an output cable with a second optical end face in opposing relation to the first optical end face and separated therefrom, and a liquid crystal window disposed between the optical end faces and adapted to be supplied with a signal from the repeater path, with the liquid crystal window being automatically rendered transparent when no signal is supplied thereto, indicating a power failure to the repeater path or a malfunction in the repeater path, so as to pass the optical information signal from the input fiber optic cable to the output fiber optic cable, and with the liquid crystal window being rendered opaque to block any optical signal from passing therethrough when a signal from the repeater path is supplied thereto, indicating no power failure to or malfunction in the repeater path.

11 Claims, 2 Drawing Figures

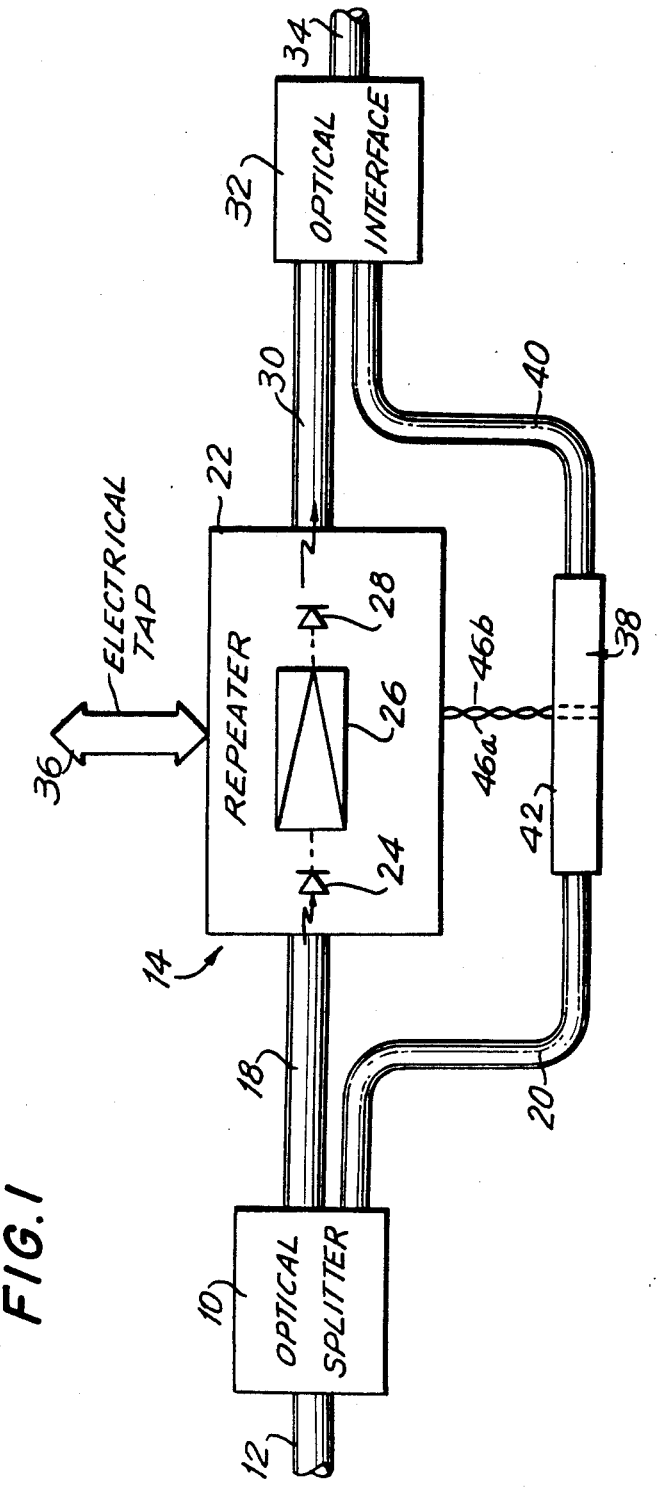
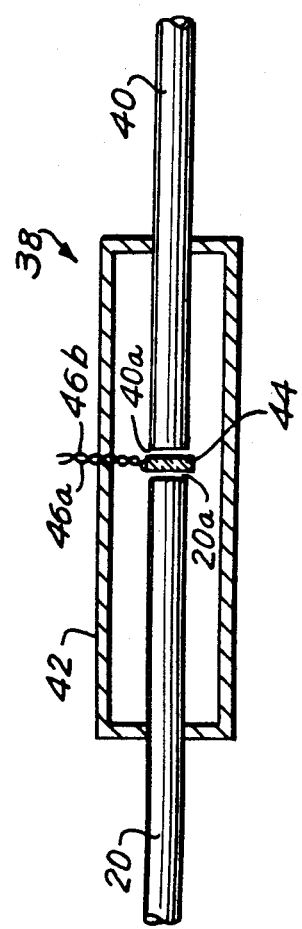
FIG.1
FIG.2

OPTICAL REPEATER SYSTEM HAVING AN AUTOMATIC OPTICAL BY-PASS

BACKGROUND OF THE INVENTION

1. Field of the Invention

The present invention relates generally to an optical transmission system and, more particularly, is directed to an optical repeater system having an automatic optical by-pass.

2. Description of the Prior Art

Optical transmission lines have recently been replacing conventional electric lines in transmitting information signals from one point to another with a minimum amount of interference. However, as with conventional electric lines, considerable loss of light energy results when such optical transmission lines are used over a relatively long distance. In other words, such optical transmission results in attentuation of the transmitted optical information signals. Accordingly, regenerative repeaters are inserted at different points along the optical transmission lines to amplify the optical information signals so as to compensate for such attenuation. Examples of such systems are shown in U.S. Pat. Nos. 3,801,819; 3,851,167; and 3,943,358.

Unfortunately, if a regenerative repeater fails to operate due to, for example, a defect in the circuitry thereof, or if no operating power is supplied to the regenerative repeater, the optical information signals are not transmitted along the transmission lines.

One system, as shown in U.S. Pat. No. 4,148,558, has been proposed which utilizes two separate optical paths which are alternately positioned in the transmission path by means of a solenoid. The first path includes a glass rod which merely transmits an input optical information signal from an optical input to an optical output. The second path includes a detector for converting the input optical information signal to an electrical signal and a light emitter which functions to convert an electrical signal supplied thereto to an optical signal and to transmit this latter optical signal to the optical output. The electrical signal from the detector is supplied to a utilization device which performs some operation in response to such signal and which supplies an electrical signal to the light emitter which does not correspond to the input optical information signal. Alternatively, the electrical signal produced by the detector can be supplied directly to the light emitter which merely reproduces the input optical information signal without modification. This device, however, does not function as a regenerative repeater to amplify the input optical information signal. In other words, the second path is positioned in the transmission path only during processing of the input optical information signal by the utilization device. Further, if at such time, the power supplied to the system should fail, or if the detector, the light emitter or utilization device should malfunction or fail to operate, no optical signal is transmitted to the optical output. In other words, the first transmission path constituted by the glass rod is not automatically substituted for the second transmission path.

OBJECTS AND SUMMARY OF THE INVENTION

Accordingly, it is an object of this invention to provide an optical transmission system that avoids the above-described difficulties encountered with the prior art.

More particularly, it is an object of this invention to provide an optical regenerative system that always transmits an optical information signal regardless of power failure or failure in the optical regenerative system itself.

It is another object of this invention to provide an optical regenerative system including a first optical repeater path which amplifies and transmits an optical information signal supplied thereto and a second by-pass path for transmitting the optical information signal without modification during a power failure or during failure of the first repeater path.

In accordance with an aspect of this invention, apparatus for transmitting an optical information signal from an optical input to an output includes a first path for amplifying the optical information signal and for supplying the amplified optical information signal to the optical output, and a second path responsive to the first path for transmitting the optical information signal only when the first path is inoperative.

The above, and other, objects, features, and advantages of the invention, will become apparent in the following detailed description of illustrative embodiments of the invention which is to be read in connection with the accompanying drawings.

BRIEF DESCRIPTION OF THE DRAWINGS

FIG. 1 is a schematic diagram of an optical transmission system according to one embodiment of the present invention; and FIG. 2 is a schematic diagram of one embodiment of a liquid crystal gate that can be used in the system of FIG. 1.

DETAILED DESCRIPTION OF A PREFERRED EMBODIMENT

Referring to the drawings in detail, and initially to FIG. 1 thereof, there is shown one embodiment of an optical transmission system according to the present invention. As shown therein, the optical transmission system includes an optical splitting device 10, such as a "Y" splitter which receives an input optical information signal from an input fiber optic cable 12. Optical splitting device 10 functions to pass the input optical information signal to a first amplification path 14 and to a second by-pass path through fiber optic cables 18 and 20, respectively.

The first amplification path 14 includes a regenerative repeater circuit 22 supplied with the input optical information signal from fiber optic cable 18. Repeater circuit 22 converts the optical input information signal to a corresponding electrical signal by means of a monolithic recovery device, such as a pin or avalanche diode 24, shown schematically in FIG. 1. This electrical signal is then amplified by an amplifier circuit 26 in repeater circuit 22 and conditioned by a respective circuit (not shown) to reduce noise and the like, so as to produce an electrical signal which accurately corresponds to the original optical signal transmitted through the transmission lines. It should be appreciated that repeater circuit 22 may include an electrical tap 36 for monitoring or modifying this electrical signal. This latter electrical signal is then reconverted to an optical signal by means of a monolithic light generating device, such as an LED or laser diode 28, also shown schematically as part of the repeater circuit 22 in FIG. 1. This optical signal accurately corresponds to the original optical signal transmitted through the transmission lines and is supplied through a fiber optic cable 30 to an optical interface device 32 which, in turn, transmits the optical signal to an output optical fiber cable 34.

The input optical information signal is further supplied from optical splitting device 10 through fiber optical cable 20 to the second by-pass path which is operative to optically transmit such signal to optical interface 32, normally without modification, if the power supplied to repeater circuit 22 fails or if repeater circuit 22 itself should fail. In other words, the by-pass path is operative only when repeater circuit 22 fails to supply an optical signal to optical interface device 32. However, when the electrical circuitry of repeater circuit 22 is operative, the optical by-pass path functions to block any signal supplied thereto so as to be functionally severed from the transmission system. In this manner, any phase interference between the newly conditioned repeated signal from repeater circuit 22 and the optical signal transmitted through the by-pass path is avoided.

The by-pass path preferably includes an optical gate 38 supplied with the input optical information signal through fiber optic cable 20 and which, when operative, transmits this signal through a fiber optic cable 40 to optical interface device 32. It should be appreciated that only one signal is supplied to optical interface 32, that is, through fiber optic cable 30 or fiber optic cable 40. In other words, when repeater circuit 22 is operative, optical gate 38 functions to block the signal supplied thereto and conversely, when repeater circuit 22 is inoperative, optical gate 38 transmits the input optical information signal to optical interface device 32. Accordingly, this latter circuit 32 always supplies an optical signal corresponding to the input optical information signal to output fiber optic cable 34.

In a preferred embodiment, optical gate 38 is comprised of a fiber optic liquid crystal gate (FOLCG), as shown more particularly in FIG. 2, which either transmits or attenuates, that is, blocks, the optical signal supplied thereto. In particular, the FOLCG includes a housing 42 which receives fiber optic cable 20 through one end thereof and which receives the fiber optic cable 40 through the other end thereof such that the optical end faces 20a and 40a thereof are in parallel and axial alignment with each other. A liquid crystal window or button 44 is disposed in the space between the optical end faces 20a and 40a for either transmitting or blocking the optical signal from fiber optic cable 20. In particular, two control wires 46a and 46b from repeater circuit 22 are connected to liquid crystal window 44 for varying the transparency thereof from a transparent condition to an opaque condition. For example, control wires 46a and 46b can be used to sense the presence or absence of power supplied to repeater circuit 22, or to sense the presence of absence of an output electrical signal from amplifier circuit 26 of repeater circuit 22, to vary the transparency of liquid crystal window 44. Thus, if the power supplied to repeater circuit 22 is interrupted or if a malfunction occurs in repeater circuit 22, no signal is supplied through control wires 46a and 46b to liquid crystal window 44 so that the latter is placed in its transparent condition. This results in the transmission of the input optical information signal from fiber optic cable 20 to optical interface 32 through fiber optic cable 40. However, if no such malfunction or power failure occurs, control wires 46a and 46b supply a potential to change the transparency of liquid crystal window 44 to its opaque condition to block any optical signal therethrough. In other words, by means of the presence or absence of an electrical potential across liquid crystal window 44, the transparency thereof can be controlled. It should be appreciated, however, that a signal may be supplied to liquid crystal window 44 through control wires 46a and 46b by sensing various other conditions in repeater circuit 22 or, for example, by sensing the output from electrical tap 36.

In addition, by providing dot patterns on liquid crystal window 44 and selectively activating those patterns, different magnitudes of optical attenuation can be obtained for the input optical information signal supplied therethrough. In other words, liquid crystal window 44 may be operative in a translucent condition between its transparent and opaque conditions.

Having described a specific preferred embodiment of the present invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Apparatus for transmitting an optical information signal from an optical input to an optical output, comprising:
a first path always connected between said optical input and said optical output and including repeater means for electrically amplifying said optical information signal and for supplying said amplified optical information signal to said optical output; and
a second optical path always connected between said optical input and said optical output and including optical gate means responsive to said first path for optically transmitting said optical information signal to said optical output only when said first path is inoperative.

2. Apparatus according to claim 1; in which said gate means optically transmits said optical information signal during one of failure of said repeater means and power failure to said repeater means.

3. Apparatus according to claim 2; in which said repeater means includes first semiconductor means for converting said optical information signal to an electrical signal, amplifier means for amplifying said electrical signal, and second semiconductor means for converting said amplified electrical signal to an optical signal to produce said amplified optical information signal.

4. Apparatus according to claim 3; in which said repeater means further includes electrical tap means for one of monitoring and modifying said electrical signal.

5. Apparatus for transmitting an optical information signal from an optical input to an optical output, comprising:
a first path connected between said optical input and said optical output and including repeater means for electrically amplifying said optical information signal and for supplying said amplified optical information signal to said optical output; and
a second optical path connected between said optical input and said optical output and including gate means responsive to said first path for optically transmitting said optical information signal to said optical output only when said first paths is inoperative during one of failure of said repeater means and power failure to said repeater means, in which said gate means includes an input fiber optic cable supplied with said optical information signal from said optical input and having a first optical end face, an output fiber optic cable supplied with said optical information signal from said input fiber optic cable and having a second optical end face in opposing relation to said first optical end face and separated therefrom, and window means disposed between said first and second optical end faces for one of transmitting and blocking said optical information signal supplied from said input fiber optic cable to said output fiber optic cable.

6. Apparatus according to claim 5; in which said window means includes a liquid crystal window which is rendered one of transparent and opaque in response to the absence or presence of an electric signal supplied thereto.

7. Apparatus according to claim 6; in which the presence or absence of said electric signal corresponds to one of the presence and absence of power supplied to said repeater means, and said gate means includes wire means for supplying said electric signal to said liquid crystal window.

8. Apparatus according to claim 6; in which the presence or absence of said electric signal corresponds to one of the operation and malfunction of said repeater means, and said gate means includes wire means for supplying said electric signal to said liquid crystal window.

9. Apparatus for transmitting an optical information signal from an optical input to an optical output, comprising:
a first path connected between said optical input and said optical output and including repeater means for electrically amplifying said optical information signal and for supplying said amplified optical information signal to said optical output; and
a second optical path connected between said optical input and said optical output and including gate means responsive to said first path for optically transmitting said optical information signal to said optical output only when said first path is inoperative during one of failure of said repeater means and power failure to said repeater means, in which said gate means includes an input fiber optic cable supplied with said optical information signal from said optical input and having a first optical end face, an output fiber optic cable supplied with said optical information signal from said input fiber optic cable and having a second optical end face in opposing relation to said first optical end face and separated therefrom, and window means disposed between said first and second optical end faces for one of transmitting and attenuating said optical information signal supplied from said input fiber optic cable to said output fiber optic cable, said window means including a liquid crystal window adapted to be selectively activated for optically attenuating said optical information signal supplied from said input fiber optic cable.

10. Apparatus for transmitting an optical information signal from an optical input to an optical output, comprising:
a first path connected between said optical input and said optical output and including repeater means for electrically amplifying said optical information signal and for supplying said amplified optical information signal to said optical output;
a second optical path connected between said optical input and said optical output and including gate means responsive to said first path for optically transmitting said optical information signal to said optical output only when said first path is inoperative during one of failure of said repeater means and power failure to said repeater means;
optical splitting means for supplying said optical information signal to said first and second paths; and
optical interface means supplied with the outputs of said first and second paths for supplying said amplified optical information signal from said first path to said optical output when said repeater means is operative and for supplying said optical information signal from said second path to said optical output during one of failure of said repeater means and power failure to said repeater means.

11. Apparatus for transmitting an optical information signal from an optical input to an optical output, comprising:
a main path always connected between said optical input and said optical output and including means for electrically amplifying said optical information signal and for supplying said amplified optical information signal to said optical output; and
a by-pass optical path always connected between said optical input and said optical output and including optical gate means for automatically and optically transmitting said optical information signal only during failure of said main path to operate.

* * * * *